Figure 1:
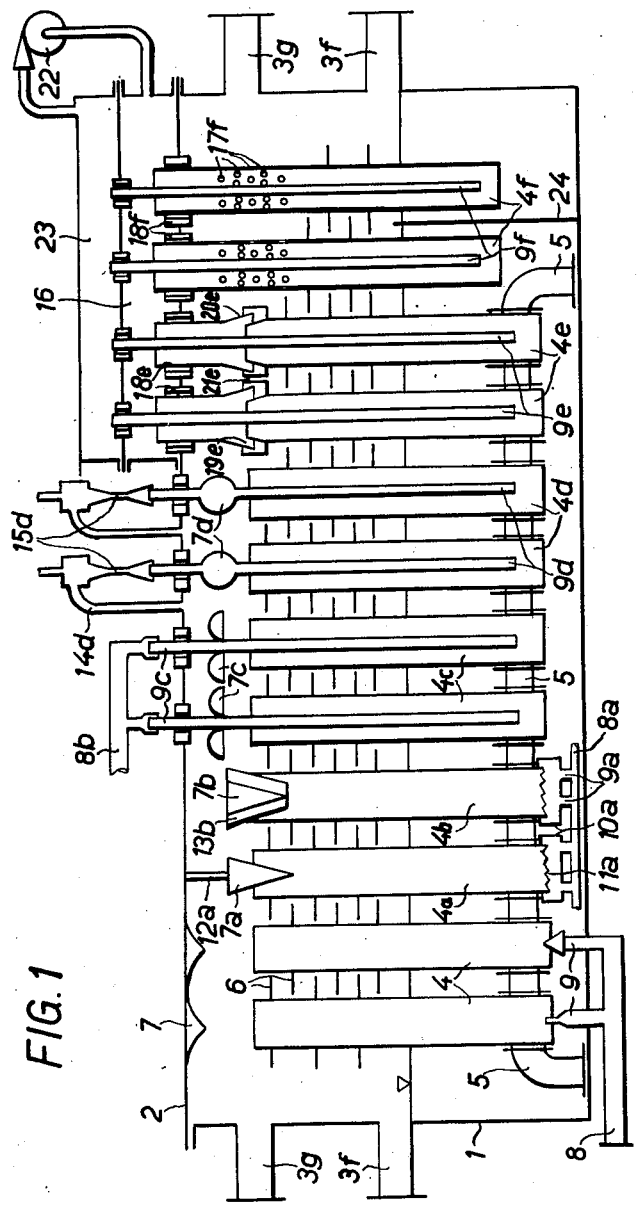

May 28, 1957 A. HALTMEIER 2,793,939
APPARATUS FOR EFFECTING AN EXCHANGE PROCESS BETWEEN
A LIQUID AND A GAS
Filed June 24, 1952 3 Sheets-Sheet 2

INVENTOR.
ALFRED HALTMEIER
BY
ATTORNEYS

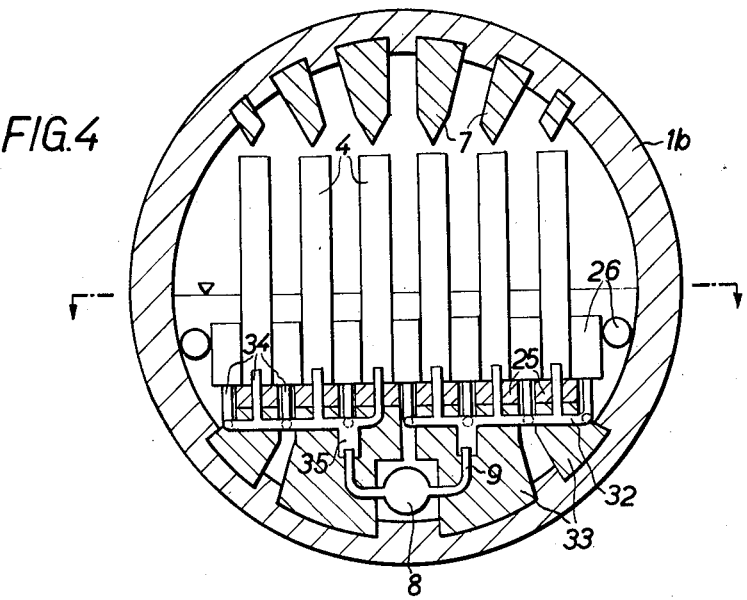
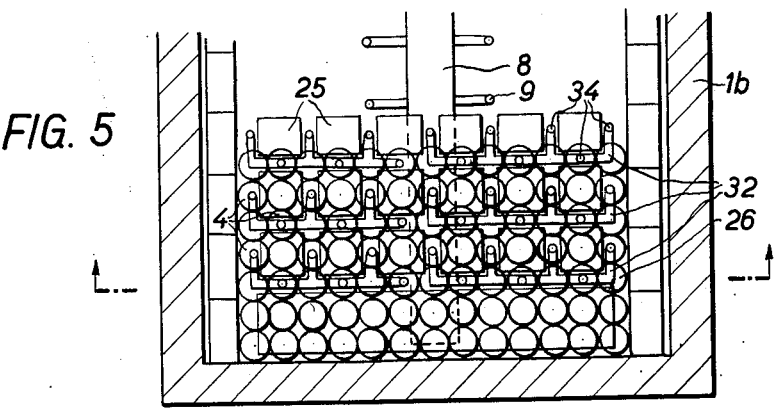

United States Patent Office 2,793,939
Patented May 28, 1957

2,793,939

APPARATUS FOR EFFECTING AN EXCHANGE PROCESS BETWEEN A LIQUID AND A GAS

Alfred Haltmeier, Leverkusen-Bayerwerk, Germany, assignor to Farbenfabriken Bayer Aktiengesellschaft, Leverkusen, Germany, a corporation of Germany Application June 24, 1952, Serial No. 295,276

Claims priority, application Germany July 2, 1951

3 Claims. (Cl. 23—261)

The present invention relates to a method of, and apparatus for, effecting an exchange process between a liquid and a gas, particularly in the manufacture of sulfuric acid.

The terms "gas" and "gaseous" as used herein are to be understood as including "vapor" and "vaporous."

It has been proposed to produce sulfuric acid by treating the hot $SO_3$-containing gases with boiling sulfuric acid in order to adsorb the $SO_3$. This process has advantages, including the possibility of almost completely obviating the very high consumption of cooling water required by previous methods. But considerable difficulties are involved which, up to the present, have prevented the carrying out of the process on a commercial scale.

The present invention provides a method of effecting an exchange process between a liquid and a gas or vapor flowing through the upper part of a horizontal or inclined container or duct, the lower part of which is filled by a bath of the liquid (preferably for the adsorption of sulfur trioxide gas in sulfuric acid, the cooling with air of the hot sulfuric acid is formed, and the washing of the acid-containing waste gases with sulfuric acid) wherein the liquid is raised by means of a gaseous pressure medium through upright or inclined rising pipes disposed in the bath and extending above the level of the bath and is allowed to run down again into the bath. Air or vapor or mixtures of air and vapor may be used as the pressure medium. In cases where the presence of the pressure medium might affect the course of the process, the pressure medium can be produced by compressing a part of the gas flowing over the liquid bath. Jet compressors can be employed where other compressors would be corroded. The pressure medium can also be produced by vaporizing part of the liquid.

A trough provided with a cover plate or a tube closed at the ends, having inlet and outlet pipes, is preferably employed in carrying the process of the invention into effect. The trough or tube is arranged to form a bath of liquid over which the gas is passed. A number of rising pipes are arranged in the lower, liquid-filled section of the trough or tube, the pipes projecting above the liquid level. By introducing the pressure medium into these pipes the liquid therein is driven upwardly and flows down over the outer surface of the pipes or over cascades, packing bodies or the like, forming an effective surface for the desired exchange of material and heat with the gas flowing by. The rising pipes are provided with openings at their lower ends or are spaced from the bottom of the bath to enable the liquid to flow in. They may be mounted for instance on a grating located in the liquid bath. When corrosive liquids are used, the grating may be replaced by bricks or by pieces of pipe, for instance of quartz or glass, which are placed in the bath. Bricks consisting for instance of quartz may be fitted in the lining of the container so as to project from the lining.

To prevent the rising pipes tilting over, it is of advantage to connect them to each other or to arrange them so that they support each other, for instance by means of spacers which may consist of pieces of pipe. To prevent the liquid becoming mixed in its direction of flow, especially in distillation and rectification, the bath may be subdivided by partitions into compartments which are not tightly closed from each other, but allow the passage of liquid in the direction of flow. To prevent any drops of liquid from being carried along in the direction of the gas flow the gas chamber may be subdivided by partitions allowing the passage of gas, for instance by means of vertical or horizontal Venetian blind partitions.

The pressure medium passes through supply pipes into the lower ends of the rising pipes below the liquid level. The supply pipes for the pressure medium may be fixed to and pass through the bottom of the container and may be fed with pressure medium from one or more manifolds arranged below the bottom of the container. When operating with very corrosive liquids, for instance hot sulfuric acid, the trough is lined with bricks which are resistant to chemical attack, for instance silicon dioxide, quartz, lava, graphite or carbon. To avoid perforation of the lining it may be preferable for the pipes supplying the pressure medium, which consist for instance of glass or quartz, to enter from above and branch at their lower ends to supply a number of the rising pipes with the pressure medium. The supply pipes are fed with the pressure medium from manifolds which may be arranged inside or outside the container in which the treatment is carried out. When the manifolds are arranged outside, the pipes supplying the pressure medium can pass through the cover plate of the reactor.

For the treatment of hot sulfuric acid or corrosive gases the covering may be formed for instance by pipes of glass or quartz, arranged side by side with openings for the passage of the pipes supplying the pressure medium. In this case the manifolds for the pressure medium may be arranged above the cover; the manifolds may consist of glass and may be jacketed with glass-wool. Since a cover of pipes of glass or quartz arranged side by side does not provide a perfect seal, an upper seal may be provided, for instance by an iron cover; it is also feasible to employ for this purpose the upper wall of the tube, which of course is irremovable. To protect the iron surface of the cover from attack by corrosive gases it is preferable to fill the space between the glass or quartz cover and the iron wall with glass wool. If the upper tight cover is curved cylindrically, it may be lined with bricks which are resistant to corrosion. If the pipes supplying the pressure medium are to pass through the tight cover from a manifold for the pressure medium, which is arranged outside the reactor, no special protection of the iron surface is required if the latter is heated from outside to prevent condensation, which can be effected for instance by passing the preheated pressure medium along the outside of the iron wall.

The invention may also be applied with success to the treatment of liquids containing solids. To prevent any sediment lying on the bottom of the reactor, the latter is preferably arranged in a sloping position or provided with slanting surfaces which lead to mud-discharging outlets.

When the troughs or tubes are brick-lined, the distributing pipes and manifolds for the pressure medium may be accommodated in recesses which are formed by the supporting bricks inserted in the lining. To avoid heat stresses in the manifold it is of advantage not to connect the distributing pipes and the manifold rigidly to each other. For instance, outlet orifices for the pressure medium may be arranged on the distributing pipes, for instance with relatively short outlet pipes, below or inside the inlet orifices provided on the distributing pipes so as to provide a free space between the orifices. Deflectors, for instance plane or curved plates or wedges, may be arranged above the pipes to deflect the liquid emerging from the pipes. The liquid surface can be increased by the arrangement of cascades, filling bodies or irrigation devices or the like in the reactor, over which the liquid which has been raised runs down. Furthermore the rising pipes can be provided with openings, for instance slots, discontinuities or holes, from which liquid emerges or sprays out. Such pipes provided with openings for egress of the liquid can pass through the cover of the reactor to a collecting pipe or a collecting chamber for the pressure medium to be discharged. This prevents the pressure medium from mixing with the gases or vapors present in the reactor. In this case a circulating blower for the pressure medium may be provided, which allows re-use of the same pressure medium. Jet blowers may also be used for circulating the pressure medium. If the gases or vapors present in the reactor are employed as the pressure medium, it is of advantage to use jet blowers to draw off gases or vapors at certain places from the reactor and blow the same as the pressure medium into certain groups of rising pipes. Distillation or rectification can thus be effected. The jet blowers are driven for instance by vapors obtained by evaporation of liquid present in the reactor. If the treatment is to be carried through in steps, for instance analogous to the technique in plate-type columns, the liquid bath can be subdivided in the direction of flow into compartments which are provided with openings for the passage of liquid from compartment to adjacent compartment in the direction of flow.

When the space is restricted or the treatment is to be carried out at super- or sub-atmospheric pressure, it may be of advantage to superpose several containers through which the liquid flows successively, preferably inside an upright tube. With such arrangement a free space is left to allow the gas under treatment to flow from container to adjacent container; the vapor spaces above the baths are separated from one another by means of drip plates, for instance vertical or horizontal Venetian blind partitions, which allow vapor to pass. Inside any one container the flow of liquid is substantially horizontal. When containers arranged one above the other are used for distillation or rectification—which is preferably carried out at subatmospheric pressure, because the losses of pressure occurring in the vapor phase in this arrangement are very low—spiral or serpentine heating elements, for instance steam coils, are preferably arranged in the containers; said heating elements generate the pressure medium by evaporating part of the liquid. To collect the vapor bubbles the lower parts of the rising pipes can be enlarged funnel-wise. To avoid any undesired increase in the amount of the vapor phase from step to step, condensor systems, for instance cooled coils, may be equipped, which condense vapor in quantities equivalent to the amounts of pressure medium freshly supplied.

Some embodiments of the invention will now be described by way of example with reference to the accompanying drawings.

Fig. 1 of the accompanying drawings is a longitudinal section through a trough 1 which is covered by a plate 2. The trough is provided with four pipe connections, the two lower connections 3f serving as inlet and outlet for the liquid, whereas the two upper connections 3g serve as inlet and outlet for the gas. A grating or a frame 5 supports rising pipes 4 carrying discs 6, which are preferably staggered. Gaseous pressure medium inlet pipes 9 lead to the lower ends of the rising pipes 4, which dip below the liquid level. The upper ends of the rising pipes 4 extend above the liquid level. Because of the air-lift action of the bubbles emerging from the pipes 9 into the bath, the liquid is raised in the pipes 4 and runs down over the discs 6 which form cascades, or over filling bodies or other irrigation installations. The liquid emerging from the upper ends of the rising pipes is deflected by the deflector surfaces 7. Gas to be treated passes between the rising pipes 4 and the irrigation installations 6 under conditions which are suitable for effective exchange of material and heat between the two phases, liquid and gaseous. There are a number of possible ways of lifting liquid in the rising pipes, some of which are indicated in the middle and right hand parts of Fig. 1. Beginning from the left, the two first rising pipes are provided with injector nozzles 9 for the pressure medium, which extend through the bottom of the trough 1 and are fed with pressure medium from a manifold 8 arranged below the bottom of the trough. The next two rising pipes 4a and 4b are supplied with pressure medium by means of a manifold 8a arranged above the bottom of the trough; the manifold 8a is provided with openings 9a from which the pressure medium passes into bell-shaped enlarged portions 10a of the rising pipes 4a and 4b and over the toothed lower edge 11a into the rising pipes. The deflectors 7 for the two rising pipes shown at the left of the drawing are directly attached to the cover 2; the rising pipe 4a is provided with a deflector 7a which extends into the open top of the pipe and is connected to the cover 2 by means of a pin 12a. The deflector 7b for the rising pipe 4b is provided with ribs 13b and rests in the open top of the pipe. The next two rising pipes 4c are supplied with the pressure medium from above through pipes 9c. These consist for instance of glass and lead through bungs in the cover 2 from a manifold 8b mounted above the cover 2. Curved deflectors 7c are attached to the pipes 9c supplying the pressure medium. The next two rising pipes 4d are likewise supplied with pressure medium from above. The associated deflectors 7d are formed by enlargements in the supply pipes 9d above the rising pipes. The pressure medium is withdrawn from the reaction chamber through pipes 14d and blown into the pressure medium supply pipes 9d by means of injectors 15d.

If the pressure medium is to be kept separate from the gas to be treated, the rising pipes 4e and 4f can be led through the cover 2 into an upper compartment 16 as shown in the right hand part of Fig. 1. If the rising pipes 4f are provided with holes 17f for discharging the liquid, upper passages 18f may simultaneously serve to suspend the rising pipes as shown at the right hand side of Fig. 1.

The rising pipes 4e, shown on the left of the right hand part of Fig. 1, consist of two parts between which is a slot 19e for the outlet of the liquid. The upper parts 18e of the rising pipes are fastened to the cover 2 and are provided below with funnel-shaped enlarged portions 20e which dip into cups 21e and prevent the pressure medium from emerging there. The pressure medium reaching the upper compartment 16 can be exhausted by means of the blower 22 and blown into the pressure medium supply pipes 9f via a manifold 23. To avoid intermixing of different parts of the liquid present in different stages of the treatment and accordingly having different compositions, the treating chamber can be subdivided in the direction of flow into compartments by partitions 24, which form imperfect seals and thus permit the desired flow of liquid.

Figure 2:
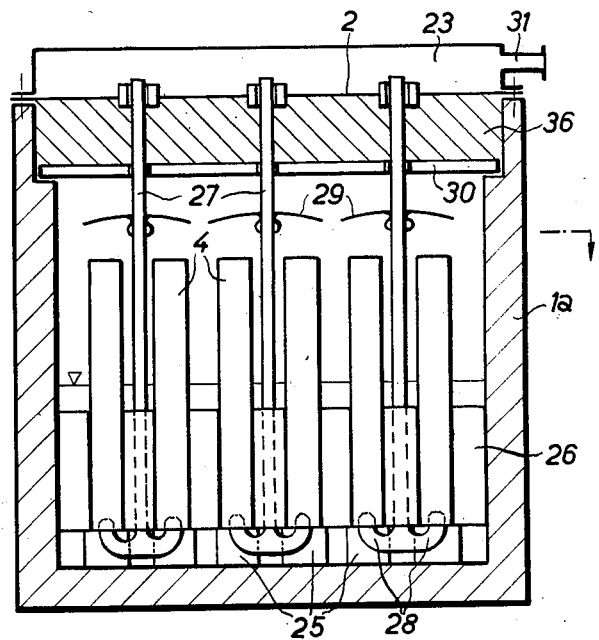

Fig. 2 is a sectional view through a brick-lined trough 1a wherein the rising pipes 4 stand on blocks, bricks or pieces of pipe 25 and are spaced by interposed pieces of pipe 26. Supply pipes 27, which carry branch pipes 28 at their lower ends, serve to introduce the pressure medium. The liquid emerging from the rising pipes 4 is deflected by the deflecting surfaces 29. The pipes 27 are attached to the cover 2, which is protected against attack by the gaseous atmosphere in the treating chamber by means of an intermediate cover 30 consisting for instance of juxtaposed glass pipes; the supply pipes 27 pass through apertures in the intermediate cover. The interspace 36 between the covers 30 and 2 is filled for instance with glass wool. A manifold 23, supplied with pressure medium through a pipe 31, is arranged above the cover 2.

Figure 3:
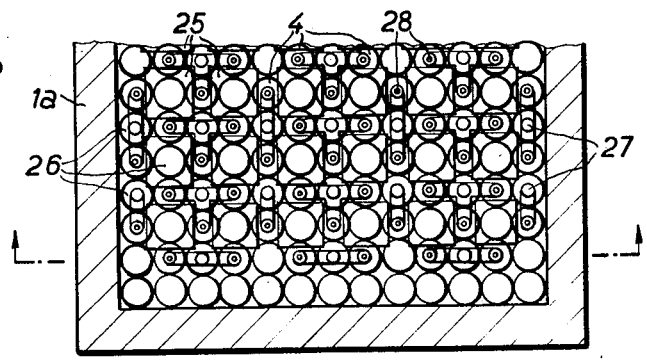

Fig. 3 is a top view of the trough shown in Fig. 2. The rising pipes 4 stand on the blocks 25 in such a manner that sufficient free space is left for the liquid to enter the lower ends of the pipes. The supply pipes 27 pass through some of the pieces of pipe 26 which serve as spacers. Each of these supply pipes 27 carries at its lower end three curved branch pipes 28, which extend into the rising pipes 4 from below.

Fig. 4 shows a cross section through a brick-lined tube 1b; the lower part of the tube 1b is filled with the liquid, for instance boiling sulfuric acid, whereas the upper part contains hot combustion gases or $SO_3$-gases from which $SO_3$ is to be absorbed in the acid, or air for cooling the acid. Rising pipes 4, consisting for instance of quartz and spacing tubes 26 are mounted on a supporting grating formed of bricks 25. Supporting bricks 33 keyed into the brick lining, are arranged below the bricks 25. As shown in the top view (Fig. 5), the bricks are arranged so as to provide between them a space for distributing pipes 32 supplying the pressure medium, for a manifold 8 with branch pipes 9, and for the entry of liquid into the rising pipes 4. The distributing pipes 32 are each provided with a number of upwardly directed discharge outlets 34 disposed in the bottoms of the rising pipes 4, and a downwardly directed intake pipe 35. The pressure medium passes through the manifold 8 and branch pipes 9 into the intake pipes 35. The manifold 8 and the distributing pipes 32 are not rigidly connected to each other in order to avoid fractures. It is of advantage to provide the ends and the sides of the treating chamber with spacing tubes 26. The deflectors 7 which deflect the liquid emerging from the rising pipes are keyed into the bricklined tube (as shown in Fig. 4).

I claim:
1. Apparatus for effecting an exchange process between a liquid and a gas, which comprises a substantially enclosed container, a liquid inlet into and a liquid outlet out of said container positioned for maintaining a liquid level in the lower portion of said container and the passage of liquid into said liquid inlet through said container and out through said liquid outlet, a gas inlet and outlet positioned for the passage of gas from said gas inlet through said container above the liquid level and out of said gas outlet, a multiple number of substantially open-ended vertical rising pipes positioned in said container with the lower terminus thereof spaced from the bottom of said container below said liquid level, and the upper terminus thereof extending through the upper wall of the container into a common collecting pipe, slots defined through the side wall of the upper portion of each of said rising pipes, above said liquid level and below said common collecting pipe so that the said liquid conveyed upward through said rising pipes will run down adjacent the outer surface of said pipe, and means for passing gas pressure media upward through each said open-ended rising pipe for the conveying of liquid from the lower portion of the pipe therethrough to said slots said impelling gas means opening into the lower portion of said open-ended rising pipes.

2. Apparatus according to claim 1 in which said means for passing liquid upward through said rising pipes includes a conduit for gaseous pressure media extending to the lower portion of these pipes and means for passing gas from said common collecting pipe to said conduit.

3. Apparatus according to claim 1 including perforate partition means subdividing said container below said liquid level into a multiple number of compartments adjacently positioned from said liquid inlet to said liquid outlet.

References Cited in the file of this patent

UNITED STATES PATENTS

| | | |
|---|---|---|
| 1,232,109 | Skoglund | July 3, 1917 |
| 1,399,526 | Schmiedel et al. | Dec. 6, 1921 |
| 1,536,463 | Westling | May 5, 1925 |
| 2,055,082 | Keyes | Sept. 22, 1936 |

FOREIGN PATENTS

| | | |
|---|---|---|
| 23,351 | Great Britain | Oct. 15, 1913 |
| 274,919 | Great Britain | July 29, 1927 |